(12) United States Patent
Stauber et al.

(10) Patent No.: US 11,989,277 B2
(45) Date of Patent: May 21, 2024

(54) ACCESS AUTHORIZATION BY MEANS OF PERSONAL ACCESS MODULE

(71) Applicant: KRONES AG, Neutraubling (DE)

(72) Inventors: Thomas Stauber, Obertraubling (DE); Sebastian Vogl, Regensburg (DE)

(73) Assignee: KRONES AG, Neutraubling (DE)

( * ) Notice: Subject to any disclaimer, the term of this patent is extended or adjusted under 35 U.S.C. 154(b) by 350 days.

(21) Appl. No.: 17/283,262

(22) PCT Filed: Oct. 23, 2019

(86) PCT No.: PCT/EP2019/078854
§ 371 (c)(1),
(2) Date: Apr. 7, 2021

(87) PCT Pub. No.: WO2020/083978
PCT Pub. Date: Apr. 30, 2020

(65) Prior Publication Data
US 2021/0382975 A1    Dec. 9, 2021

(30) Foreign Application Priority Data
Oct. 23, 2018    (DE) ............... 10 2018 126 308.2

(51) Int. Cl.
*G06F 21/35*    (2013.01)
*G06F 21/32*    (2013.01)
(Continued)

(52) U.S. Cl.
CPC .............. *G06F 21/35* (2013.01); *G06F 21/32* (2013.01); *G07C 9/26* (2020.01); *G07C 9/27* (2020.01);
(Continued)

(58) Field of Classification Search
CPC .. G06F 21/35; G06F 21/32; G06F 2221/2111; G06F 2221/2139; G07C 9/26;
(Continued)

(56) References Cited

U.S. PATENT DOCUMENTS 9,565,181 B2   2/2017   Brown
2009/0260319 A1*   10/2009   Botzenhardt ........... B65B 9/045
                                                        53/393
(Continued)

FOREIGN PATENT DOCUMENTS

CN    106375945 A    10/2016
CN    106161364 A    11/2016
(Continued)

OTHER PUBLICATIONS

International Search Report dated Jan. 22, 2020 for PCT /EP2019/078854.

*Primary Examiner* — Henry Tsang
(74) *Attorney, Agent, or Firm* — Schmeiser, Olsen & Watts, LLP

(57) ABSTRACT

Provided is a method for authenticating users on a packaging industrial system having at least two operator interfaces, including the following steps: login of a user to a personal portable item, wherein the personal item including a memory with login credentials of the user for the at least two operator interfaces, wherein login credentials for the operator interfaces being different from each other, activation of the memory for a period of time, detecting the user when he is in a predefined spatial area around the operator interfaces, connecting the personal item to an operator interface when the user is detected in the associated spatial area, authentication of the user at this operator interface with the login credentials stored in the memory via the connection of the personal item to the operator interface.

8 Claims, 3 Drawing Sheets

(51) Int. Cl.
*G07C 9/26* (2020.01)
*G07C 9/27* (2020.01)

(52) U.S. Cl.
CPC ............. *G06F 2221/2111* (2013.01); *G06F 2221/2139* (2013.01); *G07C 2209/06* (2013.01); *G07C 2209/08* (2013.01)

(58) Field of Classification Search
CPC .. G07C 9/27; G07C 2209/06; G07C 2209/08; G07C 9/23; G07C 2209/64; H04L 63/0861; H04L 63/107; H04L 63/0853; H04L 63/108
See application file for complete search history.

(56) References Cited

U.S. PATENT DOCUMENTS

| | | | |
|---|---|---|---|
| 2010/0115465 | A1 | 5/2010 | Lu et al. |
| 2014/0298432 | A1* | 10/2014 | Brown .................... G06F 21/34 726/6 |
| 2017/0372055 | A1* | 12/2017 | Robinson .............. H04W 12/64 |
| 2018/0083959 | A1 | 3/2018 | Barbosa et al. |
| 2018/0109517 | A1 | 4/2018 | Fusenig |
| 2019/0246276 | A1* | 8/2019 | Lingala ................. H04W 12/08 |

FOREIGN PATENT DOCUMENTS

| | | |
|---|---|---|
| DE | 102009017567 A1 | 10/2009 |
| DE | 10 2014 210 933 A1 | 3/2015 |
| DE | 10 2015114 367 A1 | 3/2017 |
| DE | 10 2016 220 544 A1 | 4/2018 |
| WO | 2011/028874 A1 | 3/2011 |
| WO | 2015/082615 A1 | 6/2015 |
| WO | 2017214795 A1 | 6/2016 |

\* cited by examiner

ACCESS AUTHORIZATION BY MEANS OF PERSONAL ACCESS MODULE

CROSS-REFERENCE TO RELATED APPLICATIONS

This application claims priority to PCT Application No. PCT/EP2019/078854, having a filing date of Oct. 23, 2019, based on German Application No. 10 2018 126 308.2, having a filing date of Oct. 23, 2018, the entire contents both of which are hereby incorporated by reference.

FIELD OF TECHNOLOGY

The following relates to a method and an apparatus for authenticating users to a packaging industrial system.

BACKGROUND

Plants and systems consisting of machines, controllers and control rooms are increasingly becoming the focus of IT security considerations. To log on to a system (e.g., HMI), it is currently necessary to identify oneself to the system using a token and key (PIN). After checking the PIN, authorizations are released. After a defined time, the system automatically deactivates the logged-in user.

For greater security, the longest possible keys with special characters that are unique per system are recommended and must be changed at regular intervals. Long, changing keys with special characters, which are changed regularly, mean an increased support and administration effort for the customer and are therefore usually not used in practice. Furthermore, there is often a lack of the necessary technology or infrastructure (e.g., Active Directory connection).

Further disadvantages of using long keys also result from the fact that the key must be entered each time the user logs in. Long and complex keys are also difficult to remember. Long and complex keys are also difficult to enter; typing errors, especially when using special characters, are therefore very likely. The key must also be communicated to the user and can become public knowledge if the user behaves carelessly.

SUMMARY

An aspect relates to a method and an apparatus for authenticating users securely and reliably without the method and apparatus having the disadvantages mentioned.

A method according to embodiments of the invention for authenticating users on a packaging industrial system with at least two operator interfaces comprises the following steps:
  login of a user to a personal portable item, wherein the personal item having a memory containing user login credentials for the at least two operator interfaces, wherein the operator interface login credentials being different from each other,
  activation of the memory for a period t,
  detect the user when they are in a predefined spatial area around the operator interfaces,
  connection of the personal item to an operator interface when the user is detected in the associated spatial area,
  authentication of the user at this operator interface with the login credentials stored in memory via the connection of the personal item to the operator interface.

A personal item is understood to be an electronically portable device for normal personal use. In particular, a watch, smart clothing (e.g., jacket with integrated electronics/power supply, . . . ), rings or bracelets, glasses, shoes, etc. are conceivable.

Possible operator interfaces include HMI, customer PCs, control stations, access to databases, etc.

Embodiments of the invention are particularly advantageous when a plurality of operator interfaces are to be operated by a user. In particular, it is conceivable that the user is assigned individual login credentials for each operator interface. In particular, it is conceivable that these login credentials are all different from each other. This means that the login credentials differ from each other in at least one feature. For example, it is possible that a user requires a separate password for each operator interface.

The personal object can serve as a password safe. This means that the memory of the personal item can contain login credentials for various operator interfaces. In an embodiment, login credentials with strong keys can be selected, since the user no longer has to memorise them and no longer has to re-enter them for each login process at an operator interface. Instead, it is sufficient for the user to approach an operator interface (for example, a touch system). In this case, the personal item connects to the operator interface and takes over the login with the login credentials from the password safe that is appropriate for the system. It is therefore no longer necessary for the user to login directly to the system.

The advantages of embodiments of the invention thus lie in particular in the fact that the login can take place with a high key strength and a direct, recurring login to the systems by the user is no longer necessary.

Advantageously, the memory of the personal item in which the login credentials are stored is secured separately.

In a method, the user only needs to login to their personal item once (for example, once a day). The login to the personal item can be interactive. It is possible, for example, that the user is guided through a login process. This can also simplify the login process to the personal item itself.

In a method, the login of the user to the personal item is carried out actively by the user. Advantageously, the login is carried out by a biometric verification procedure and/or a personal password.

As a biometric verification method, a check of a fingerprint can be considered in particular. However, iris or retina recognition, verification of facial geometry, hand geometry, palm line structure, palm vein structure or nail bed pattern would also be possible. A verification of the voice would also be conceivable. The personal item therefore has a sensor suitable for the selected test method.

However, it would also be conceivable in addition or alternatively that a personal password must be entered at the personal item. In an advantageous method, the user is also given the opportunity to change his personal password. In an embodiment, however, only the change to a password with a high key strength is permitted.

This procedure is particularly advantageous because it ensures that loss of the personal item is not critical, as the password safe cannot be activated without the owner's personal password and/or fingerprint.

In a method, the period t for which the memory is activated is determined on the one hand by a predetermined time. For example, it is conceivable that the memory can be activated for a maximum of 24 hours, so that it is ensured that the user logs in to his personal item at least once a day.

In a method, however, the period t during which the memory is activated also ends on the other hand when the user is no longer carrying the personal item. Advantageously, the password safe of the personal item is therefore activated after successful login until the personal item is no longer carried by the user. The determination that the personal item is no longer being worn by the user is made, for example, via a heat sensor or a pulse monitor. However, it is also possible that other biometric data is measured via a sensor, from which it can be concluded whether the personal item is still being worn on the body.

When measuring whether the personal item is still worn on the body, it is possible to carry out a corresponding measurement at regular intervals. Advantageously, this measurement takes place at short time intervals, at time intervals of less than 30 minutes, at time intervals of less than 15 minutes and at time intervals of less than 5 minutes.

In a method, the measurement of whether the personal item is still worn on the body is not only carried out at regular intervals, but continuously. This leads to a particularly high level of security of the method. In this way, it can be particularly safely avoided that the personal item is taken off and put on by an unauthorised person.

Advantageously, a short interruption of the measurement or a negative result of the measurement over a short period of time does not immediately lead to a deactivation of the memory, since this can also be only a short disturbance. In an embodiment, this accepted period is a period of less than 1 min, a period of less than 30 s, and especially less than 10 s. In an embodiment, however, this period is longer than 1 ms, longer than 10 ms and longer than 100 ms. In this way, it is advantageously ensured that short-term disturbances during the measurement do not immediately lead to deactivation, after which the user must login to the personal item again. Misuse of the personal item by an unauthorised person is nevertheless avoided.

In an advantageous method, the activation of the memory is only possible when the personal object is worn, in particular carried on the body. Advantageously, a biometric sensor reports whether the personal item is currently being worn on the body before the user logs in to the personal item.

In a further method, the connection of the personal item with the operator interface and/or the authentication of the user with the login credentials stored in the memory are contactless. Advantageously, the connection of the personal item with the operator interface and/or the authentication of the user are carried out by Bluetooth.

Advantageously, this connection and/or the authentication of the user take place automatically without being initiated manually by the user. In an embodiment, the appropriate login credentials are automatically selected from the password safe when it is activated. Advantageously, a unique and automatic assignment of the login credentials to the respective operator interface takes place. This simplifies and accelerates the authentication process at the operator interface.

In a method, the detection of whether a user is located in a predefined spatial area around the operator interfaces is contactless. Advantageously, this detection is carried out in particular by near field communication (NFC). The predefined spatial area around the operator interfaces is the area in which the user is close enough to the operator interface to be detected by near field communication.

In this way, an automatic connection can advantageously take place as soon as the user is close enough to the operator interface for a connection to be made by near-field communication.

In an advantageous method, detection by near-field communication can be combined with a further contactless detection. Pre-detection is advantageously carried out via contactless detection, which has a greater range than the near field communication. In an embodiment, a detection, in particular a pre-detection, can take place via Bluetooth, for example. Pre-detection advantageously registers whether a user is in the vicinity of an operator interface.

Advantageously, this pre-detection can take place in a second spatial area that is larger than the predefined spatial area in which the authentication of the user is possible. The actual activation of a user only takes place when the user is in the predefined spatial area.

In an embodiment, only those users are kept available who are located in the second spatial area. In this way, more complex user releases can be realised, as only a few users need to be kept available. Advantageously, the users that are located in a Bluetooth reception area are kept available.

Classes 1 or 2 are advantageously considered as Bluetooth classes. Depending on the specific application, class 1 or 2 may be more advantageous. Advantageously, a Bluetooth range of about 1 metre or about 10 metres is selected for pre-detection. In an embodiment, the second spatial range therefore corresponds to a range of about 1 metre or about 10 metres around the operator interface. Advantageously, a user can therefore be pre-detected when he has approached the operator interface to about 1 metre or to about 10 metres.

Detection in the predefined spatial area by near-field communication, on the other hand, has a range of about 10 cm.

If the user leaves the predefined spatial area around the operator interface, the connection to the operator interface is interrupted in a method. Advantageously, the user is logged out in this case. On the one hand, this enables another user to authenticate himself at the respective operator interface. On the other hand, it also particularly effectively prevents unauthorised persons from gaining access to sensitive data via a user who is still logged in.

In a method, however, it is also conceivable that the user remains logged in even if he leaves the predefined spatial area around the operator interface. This is particularly advantageous if the detection works by near-field communication, since in this case the predefined spatial area is very small.

In an advantageous method, it is therefore possible for the user to remain logged in as long as he remains in a third predefined spatial area. This third predefined spatial area is larger than the first predefined spatial area. Advantageously, the user is therefore logged out when he leaves a third spatial area around the operator interface. Advantageously, the third spatial area can be identical to the second spatial area. For example, it would be possible for the user to remain logged in as long as he is still in the pre-detection reception area, in particular as long as he is still in the Bluetooth reception area.

In this way, it can be advantageously ensured that the user is only logged in at the operator interface when he is in its immediate vicinity (in the range of a few centimetres). In this way, it can be prevented, for example, that the user is logged in by mistake because he is passing near the operator interface. Nevertheless, the subsequent operation of the operator interface is more comfortable for the user because he is not logged out again immediately if he moves away from the operator interface a little. Otherwise, the user would be logged out again immediately if, for example, he holds the arm to which the personal item is attached too far away from the operator interface.

In an advantageous method, it would also be possible for the user to remain logged in for a certain period of time, even if he leaves the predefined spatial area around the operator interface. This is particularly advantageous if an application requires the user to occasionally leave the spatial area around the operator interface for a short time, but then to continue working at the operator interface again. The period of time that makes sense for this can depend on the respective application in the industry. Relevant parameters can be, for example, the security standard to be maintained, the duration required for logging in again, whether data can be lost in the event of a forced logout, whether the user can maintain visual contact with the operator interface even if he/she moves away from the immediate vicinity, etc. In an embodiment, the period of time for which a user remains logged in even when leaving the immediate vicinity can be set. Advantageously, this setting is not made by the user itself on the personal item. Instead, this setting is made via a central user-order rights administration.

In a further method, at least two users can authenticate themselves on the packaging industrial system with one personal item each. Advantageously, different authorizations can be assigned to the users for the operator interfaces.

The method according to embodiments of the invention is particularly advantageous if at least two, but in particular a plurality of users, are to be assigned authorizations for operator interfaces. Especially in large industrial plants, it is often necessary that several users are assigned different authorizations for operator interfaces. For example, it may be necessary for user 1 to be authorised to operate operator interfaces A, B and C. User 2, on the other hand, should only be authorised to operate operator interfaces A, B and C. User 2, on the other hand, should only be given authorization for operator interface B, while user 3 should be given authorization for operator interfaces C and D.

In an advantageous procedure, different users can therefore be assigned authorizations for different operator interfaces. Advantageously, it is also possible for several users to have access authorization for one operation interface.

In a method, different levels can be assigned to the different users. Advantageously, the users can be ordered hierarchically by assignment.

In an advantageous method, the hierarchical arrangement can be used to select which user input is given priority in the event of different user inputs. In an embodiment, it is possible, for example that several users parameterise at the same operator interface. Through a hierarchical arrangement of the users, it is possible, for example, to select that the parameterisation of the user with a high level prevails over that of a user with a low level.

In an embodiment, each user is assigned his or her own personal item for this purpose. Advantageously, individual login credentials are stored for each user on his personal item. In an embodiment, the login credentials of the users differ from each other in at least one feature.

In a method, the login credentials stored on the memory are managed via synchronisation with a central rights or operator administration. Advantageously, all the login credentials of a user are managed in a central rights or operator administration. In an embodiment, the login credentials of all users are managed in the central rights or operator administration. In the central rights or operator administration, a personal item can advantageously be assigned to a user.

In an embodiment, the synchronisation is done via Bluetooth using the client application of the central operator administration.

In a method, activation of the memory is blocked if synchronisation with the central rights administration has not taken place for a predefined period of time t2. Advantageously, the time period t2 can be set in the central rights or operator administration. However, it is also conceivable that a fixed predefined time period t2 must be observed. For example, it is possible that synchronisation must take place at least once a year, otherwise the password safe can no longer be activated.

Advantageously, any operating authorizations can be added to the central rights or operator administration and easily managed.

Embodiments of the present invention are further directed to an apparatus for authenticating users to a packaging industrial system having at least two operator interfaces, wherein the apparatus comprising a memory with user login credentials for the at least two operator interfaces, wherein the login credentials for the operator interfaces being different from each other, wherein the memory being activatable for a period of time, wherein the apparatus comprising a detection means or detector for detecting when the user is in a predefined spatial area around the operator interface, wherein the apparatus comprising a connection means or connector for establishing a connection between the apparatus and the operator interfaces when the user is detected by the detection means or detector in a predefined spatial area around the operator interface, wherein the user being able to authenticate himself at this operator interface by the login credentials stored on the memory for this operator interface.

In particular, the described apparatus is designed and intended to perform the above-described method, i.e., all features described for the above-described method are also disclosed for the apparatus described herein and vice versa.

In an embodiment, the apparatus is portable. Advantageously, the apparatus can be easily worn in close proximity to the body or on the body. For example, the apparatus may be a watch that can be attached to the wrist with a watchband. However, it can also be, for example, a garment equipped with the corresponding electronic functions. When the garment is put on, sensors may be in direct contact with the user's body.

In an advantageous embodiment, the apparatus has a sensor that can be used to uniquely determine the identity of the user. In an embodiment, this can be a biometric sensor. Advantageously, the apparatus can have a fingerprint scanner, for example.

In another advantageous embodiment, the identity of the user can be determined by entering a personal password. For this purpose, the personal item can have a touch display, for example. However, it would also be conceivable for the personal item has buttons or wheels for turning, via which a password can be entered.

In an advantageous embodiment, the apparatus further comprises a Bluetooth transmitter. Advantageously, the apparatus also has a Bluetooth receiver. In an embodiment, login credentials stored on the memory can be transmitted via the Bluetooth transmitter.

In an embodiment, the apparatus also has an NFC chip. Advantageously, the NFC chip can detect when the user is in the predefined spatial area around an operator interface.

BRIEF DESCRIPTION

Some of the embodiments will be described in detail, with reference to the following figures, wherein like designations denote like members, wherein.

DETAILED DESCRIPTION

Figure 1:
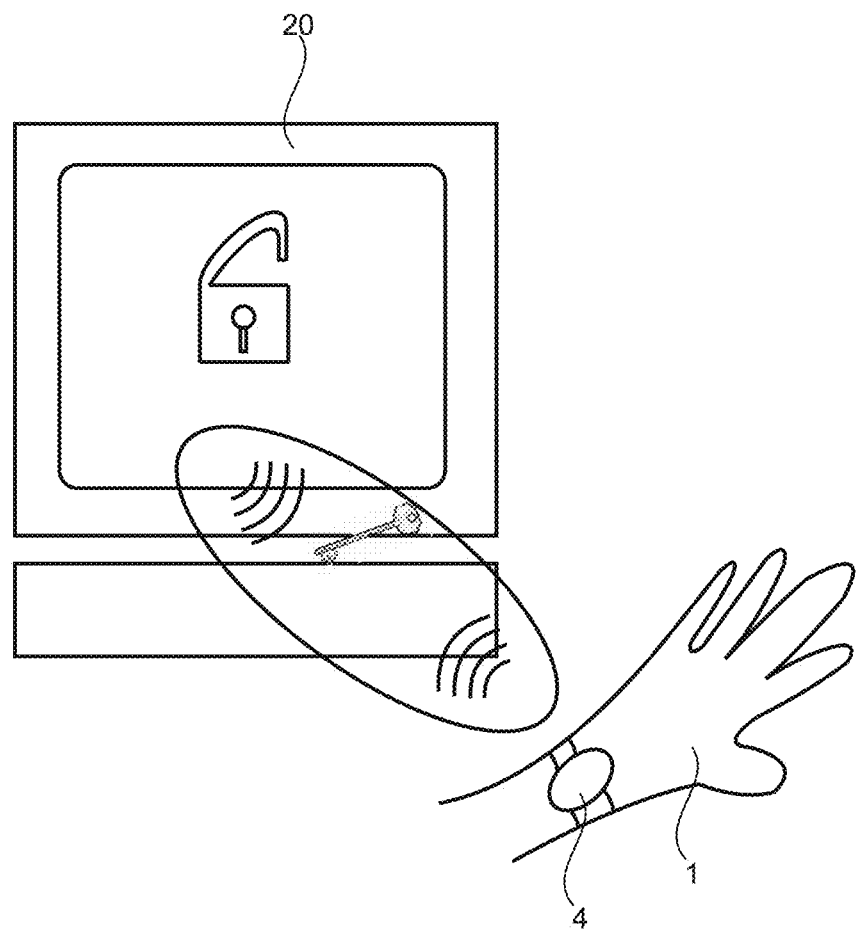
FIG. 1 shows a representation of the authentication according to embodiments of the invention.

In FIG. 1, it can be seen that a connection is established between the personal item 4 and the operator interface 20 since the personal item 4 is close to the operator interface 20. In this embodiment, the personal item 4 is, by way of example, a watch that is attached to the wrist of the user 1. The operator interface 20 is password protected, as symbolised by the lock shown. In the memory of the personal item 4, the login credentials belonging to this operator interface 20 are stored. If the connection between the operator interface 20 and the personal item 4 is successful, the operator interface 20 can be unlocked by the matching login credentials (symbolised by the key), i.e., the user 1 can authenticate himself at the operator interface 20.

Figure 2:
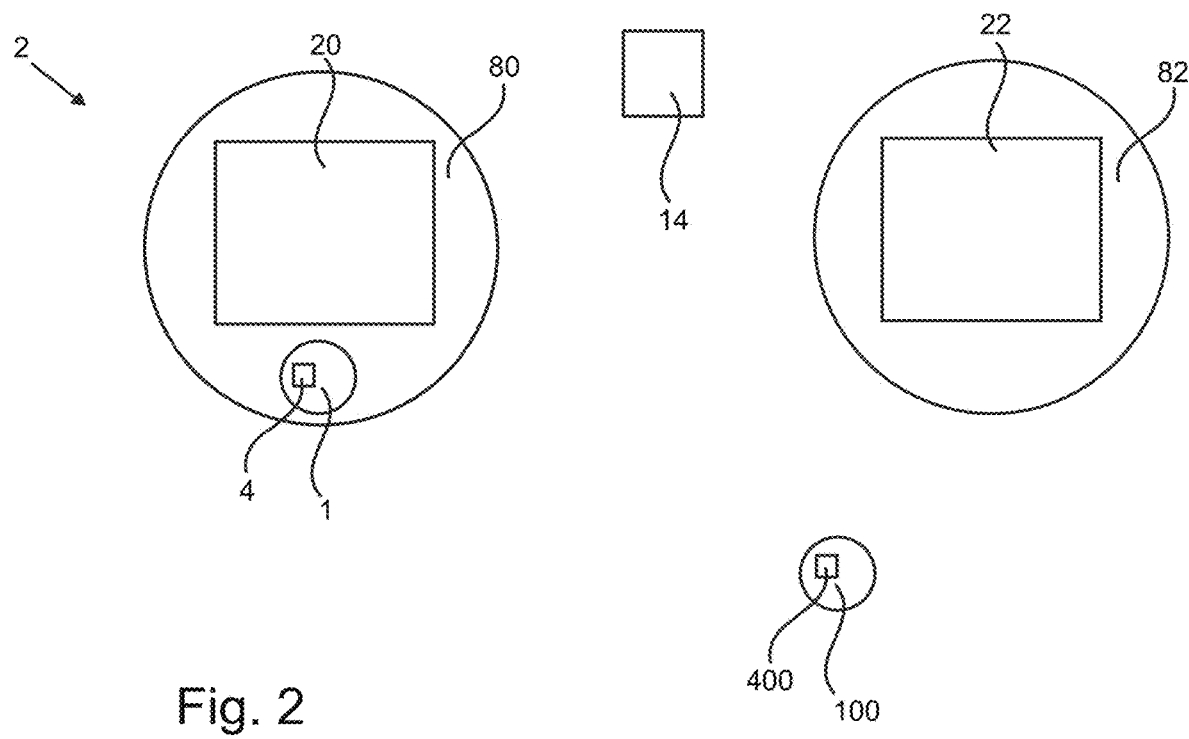
FIG. 2 shows a schematic representation of a method according to embodiments of the invention.

FIG. 2 shows a packaging industrial system 2 comprising the operator interfaces 20 and 22. The operator interfaces are each surrounded by a predefined spatial area 80 or 82. The user 1 is located within the predefined spatial area 80. The user 100, on the other hand, is located outside the predefined spatial areas 80 and 82. The user 1 carries a personal item 4, the user 100 a personal item 400. Since the user 1 is located with his personal item 4 in the predefined spatial area 80, a connection can be established between the personal item 4 and the operator interface 20. In this way, the user 1 can authenticate itself at the operator interface 20. Since the user 100 is outside the predefined spatial areas 80 and 82, he cannot authenticate itself at any of the operator interfaces 20 or 22. The central rights management 14 can also be seen, which is used to manage all login credentials.

Figure 3:
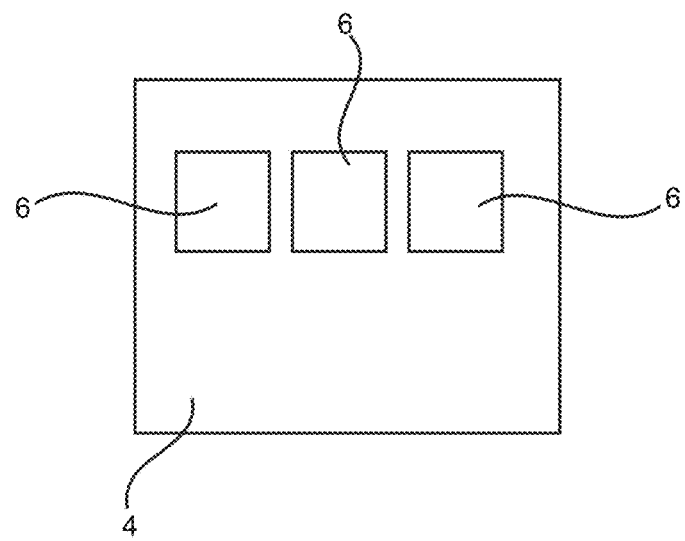
FIG. 3 shows a schematic representation of an apparatus according to embodiments of the invention.

FIG. 3 shows a schematic representation of an apparatus 4 according to embodiments of the invention. The apparatus 4 has a memory 6 in which login credentials for various operator interfaces are stored. The apparatus 4 further comprises a detection device 10 for detecting when the user 1 is in a predefined spatial area 80 or 82 around an operator interface 20 or 22. In addition, the apparatus 4 has a connection device 12 via which a connection can be established between the apparatus 4 and the operator interfaces 20 or 22.

Figure 4:
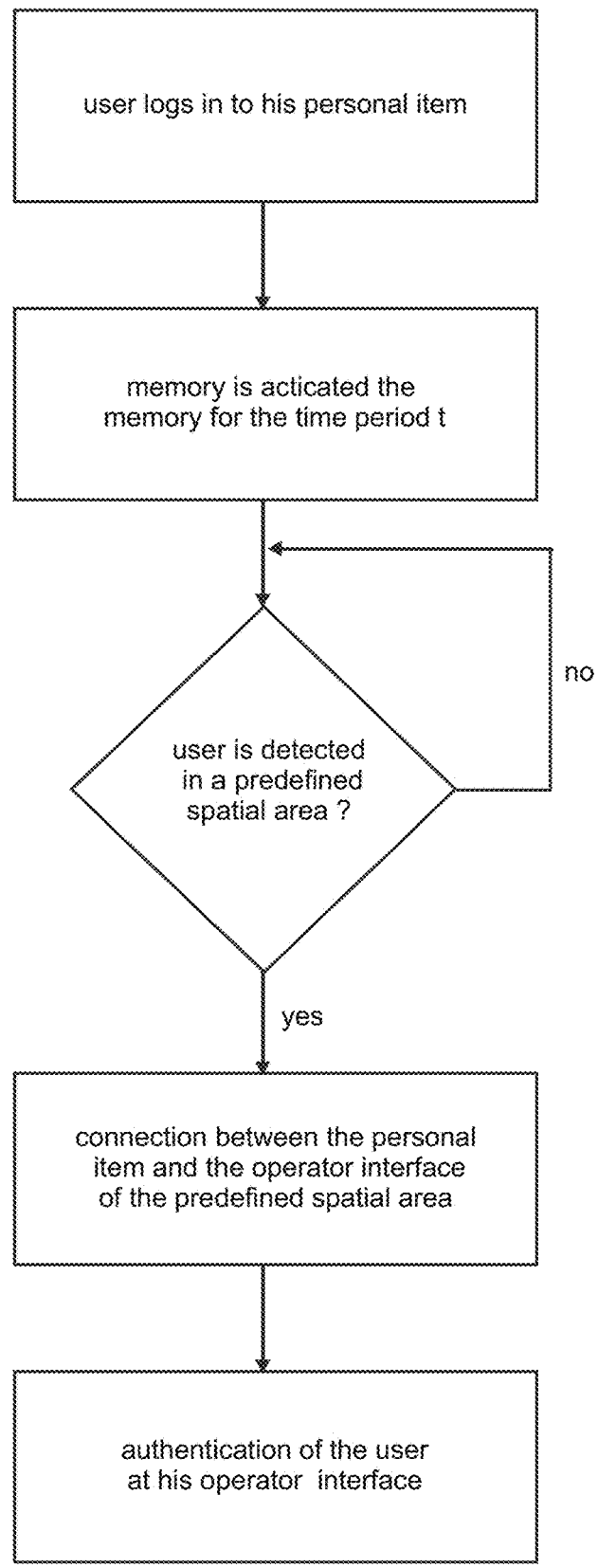
FIG. 4 shows a flow chart of the method according to embodiments of the invention.

FIG. 4 shows a flow chart of a method according to embodiments of the invention. At the beginning, the user logs in to his personal item. This activates the memory for the time period t. If the user is detected in a predefined spatial area around an operator interface after this activation, the personal item connects to this operator interface. As long as the user is not detected in a predefined spatial area, no connection can take place. In this case, no change in the situation takes place until the user is detected in a predefined spatial area at some point (or the time period t has elapsed).

If the user is detected in a predefined spatial area and the personal item and the operator interface have connected, the user can authenticate at this operator interface with the login credentials in the memory via the connection of the personal item to this operator interface.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCE SIGNS 1, 100 user
2 packaging industry system
4, 400 apparatus/personal item
6 memory
10 detection device
12 connection device
14 central rights management
20, 22 operator interface
80, 82 predefined spatial area
T period for which the memory is activated
t2 period in which synchronisation with the central rights management must take place

The invention claimed is:

1. A method for authenticating users on a packaging industrial system comprising at least two operator interfaces, comprising the following steps:
   login of a user to a personal portable item, wherein the personal portable item comprising a memory with login credentials of the user for the at least two operator interfaces, wherein the login credentials for the operator interfaces being different from each other,
   activation of the memory for a period of time,
   detecting the user when the user is in a predefined spatial area around the operator interfaces,
   connecting the personal portable item to an operator interface when the user is detected in the predefined spatial area, and
   authentication of the user at the operator interface with the login credentials stored in the memory via the connection of the personal portable item to the operator interface, wherein the login credentials stored on the memory are managed via synchronisation with a central rights management, and wherein the activation of the memory is blocked if the synchronisation with the central rights management has not taken place for a predefined period of time.

2. The method according to claim 1, wherein the user logs in to the personal portable item by a biometric verification procedure and/or a personal password.

3. The method according to claim 1, wherein the period of time during which the memory is activated ends when the user is no longer carrying the personal portable item.

4. The method according to claim 1, wherein the connecting of the personal portable item to the operator interface and/or the authentication of the user with the login credentials located in the memory is contactless.

5. The method according to claim 1, wherein the detecting of whether a user is located in the predefined spatial area around the operator interfaces takes place contactlessly.

6. The method according to claim 1, wherein at least two users can authenticate themselves on the packaging industrial system each with the personal portable item, wherein the users can be assigned different authorizations for the operator interfaces.

7. An apparatus for authenticating users on a packaging industrial system comprising at least two operator interfaces, wherein the apparatus comprising a memory with user log-in credentials for the at least two operator interfaces, wherein the login credentials for the operator interfaces are different from one another, wherein the memory can be activated for a period of time, wherein the apparatus has a detection device which can be detected when the user is within a predefined spatial range around the operator interfaces, wherein apparatus comprising a connection device via which a connection can be established between the apparatus and the operator interfaces when the user is detected by the detection device in the area belonging to an operator interface, wherein the user can be authenticated at the operator interface by the login credentials stored on the memory for the operator interface, wherein the login credentials stored on the memory are managed via synchronisation with a central rights management, and wherein the activation of the memory is blocked if the synchronisation with the central rights management has not taken place for a predefined period of time.

8. The apparatus according to claim 7, wherein the apparatus is portable.

* * * * *